US010688586B2

(12) United States Patent
Mishima

(10) Patent No.: US 10,688,586 B2
(45) Date of Patent: Jun. 23, 2020

(54) WELDING TORCH

(71) Applicant: Panasonic Intellectual Property Management Co., Ltd., Osaka (JP)

(72) Inventor: Toshiyuki Mishima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 325 days.

(21) Appl. No.: 15/743,445

(22) PCT Filed: Sep. 20, 2016

(86) PCT No.: PCT/JP2016/004277
§ 371 (c)(1),
(2) Date: Jan. 10, 2018

(87) PCT Pub. No.: WO2017/068752
PCT Pub. Date: Apr. 27, 2017

(65) Prior Publication Data
US 2018/0200825 A1    Jul. 19, 2018

(30) Foreign Application Priority Data

Oct. 23, 2015   (JP) .................................. 2015-208530

(51) Int. Cl.
*B23K 9/12*  (2006.01)
*B23K 9/173*  (2006.01)
*B23K 9/16*  (2006.01)

(52) U.S. Cl.
CPC ................ *B23K 9/12* (2013.01); *B23K 9/121* (2013.01); *B23K 9/124* (2013.01); *B23K 9/16* (2013.01); *B23K 9/173* (2013.01)

(58) Field of Classification Search
CPC .......... B23K 9/12; B23K 9/173; B23K 9/121; B23K 9/124; B23K 9/16; B23K 25/005; B23K 25/00
See application file for complete search history.

(56) References Cited

U.S. PATENT DOCUMENTS 3,857,091 A * 12/1974 Kalifon .................. G01R 31/08
324/515
4,079,231 A *  3/1978 Toth ......................... B23K 9/12
219/130.32
(Continued)

FOREIGN PATENT DOCUMENTS

CN         1471448         1/2004
CN         1757475         4/2006
(Continued)

OTHER PUBLICATIONS

English Translation of Search Report dated Jun. 24, 2019 in Chinese Patent Application No. 201680045620.4.
(Continued)

*Primary Examiner* — Paul R Durand
*Assistant Examiner* — Randall A Gruby
(74) *Attorney, Agent, or Firm* — Wenderoth, Lind & Ponack, L.L.P.

(57) ABSTRACT

A welding torch includes first to third wire passages, a wire detection space, and a wire detecting device. The first wire passage has a first wire inlet port allowing a first welding wire to enter thereto and a first wire outlet port allowing the first welding wire to be output therefrom. The second wire passage has a second wire inlet port allowing a second welding wire to enter thereto and a second wire outlet port allowing the second welding wire to be output therefrom. The third wire passage has a third wire inlet port allowing a portion of the first welding wire output from the first wire outlet port and a portion of the second welding wire output from the second wire outlet port to enter thereto, and a third wire outlet port allowing the portion of the first welding wire and the portion of the second welding wire to be output therefrom. The wire detection space is connected to the first and second wire outlet ports and the third wire inlet port. The wire detection space allows the portions of the first and (Continued)

second welding wire to pass through the wire detection space. The wire detecting device is configured to detect the portion of the first welding wire and the portion of the second welding wire in the wire detection space. The welding torch can switch between the welding wires with a simple structure.

4 Claims, 4 Drawing Sheets

(56) References Cited

U.S. PATENT DOCUMENTS

| | | | | |
|---|---|---|---|---|
| 5,060,395 | A * | 10/1991 | Pepin | B21F 23/00 29/33 M |
| 7,015,419 | B2 * | 3/2006 | Hackl | B23K 9/1087 219/130.21 |
| 8,225,977 | B2 * | 7/2012 | Meckler | B23K 9/125 226/1 |
| 8,581,146 | B2 * | 11/2013 | Daniel | B23K 9/124 219/137 R |
| 9,511,443 | B2 * | 12/2016 | Pfeifer | B23K 9/095 |
| 10,056,010 | B2 * | 8/2018 | Salsich | G09B 9/00 |
| 10,189,106 | B2 * | 1/2019 | Mehn | B23K 9/091 |
| 2001/0020663 | A1 * | 9/2001 | Petersen | B65H 63/00 242/485.7 |
| 2004/0011775 | A1 | 1/2004 | Hackl et al. | |
| 2004/0016735 | A1 * | 1/2004 | Huismann | B23K 9/0735 219/137.71 |
| 2005/0006363 | A1 * | 1/2005 | Hsu | B23K 9/0953 219/130.01 |
| 2006/0070985 | A1 | 4/2006 | Nakabayashi et al. | |
| 2006/0070987 | A1 * | 4/2006 | Daniel | B23K 9/12 219/137.71 |
| 2006/0163225 | A1 | 7/2006 | Takahashi et al. | |
| 2007/0075064 | A1 * | 4/2007 | Ikeda | B23K 9/126 219/130.21 |
| 2007/0158324 | A1 * | 7/2007 | O'Donnell | B23K 9/1068 219/137.71 |
| 2010/0224609 | A1 * | 9/2010 | Rose | B23K 9/022 219/137 R |
| 2010/0230394 | A1 * | 9/2010 | Yokota | B23K 9/0017 219/130.51 |
| 2013/0256276 | A1 * | 10/2013 | Fisher | B23K 35/361 219/73.2 |
| 2014/0319110 | A1 * | 10/2014 | Ingraham, I | B23K 9/095 219/130.01 |
| 2014/0326706 | A1 * | 11/2014 | Dunahoo | B23K 9/1336 219/137.2 |
| 2016/0059341 | A1 * | 3/2016 | Peters | B23K 9/121 219/137.44 |
| 2017/0050254 | A1 * | 2/2017 | Holverson | B33Y 70/00 |
| 2018/0015561 | A1 * | 1/2018 | Kawabe | B23K 9/295 |
| 2018/0281097 | A1 * | 10/2018 | Jansma | B23K 9/123 |
| 2018/0304391 | A1 * | 10/2018 | Kotera | B23K 9/1278 |
| 2019/0099769 | A1 * | 4/2019 | Holverson | B05B 5/001 |
| 2019/0111511 | A1 * | 4/2019 | Maruyama | B23K 9/073 |
| 2019/0366467 | A1 * | 12/2019 | Beistle | B23K 9/124 |

FOREIGN PATENT DOCUMENTS

| | | |
|---|---|---|
| JP | 56-168967 | 12/1981 |
| JP | 57-100870 | 6/1982 |
| JP | 01-170593 | 7/1989 |
| JP | 2-123388 U | 10/1990 |
| JP | 2006-102776 | 4/2006 |
| JP | 2006-198628 | 8/2006 |
| JP | 2006-281284 | 10/2006 |
| JP | 2007-000904 | 1/2007 |
| KR | 10-1595282 | 2/2016 |

OTHER PUBLICATIONS

International Search Report of PCT application No. PCT/JP2016/004277 dated Dec. 13, 2016.

Extended European Search Report dated Oct. 26, 2018 in corresponding European Patent Application No. 16857075.2.

* cited by examiner

WELDING TORCH

This application is a U.S. national stage application of the PCT international application No. PCT/JP2016/004277 filed on Sep. 20, 2016, which claims the benefit of foreign priority of Japanese patent application No. 2015-208530 filed on Oct. 23, 2015, the contents all of which are incorporated herein by reference.

TECHNICAL FIELD

The present disclosure relates to a welding torch adapted to plural types of welding wires.

BACKGROUND ART

FIG. 6 is a schematic view of conventional arc welding apparatus 501 disclosed in PTL 1. In arc welding apparatus 501, wire feeder 900 feeds welding wire 901 with torch cable 902 and feeds welding wire 903 with torch cable 904, thereby feeding the wires to welding torch 910. Welding torch 910 has inlet passage 911 to which torch cable 902 is connected, inlet passage 912 to which torch cable 904 is connected, and outlet passage 913. Inlet passage 911 and inlet passage 912 merge together at joint 914. Joint 914 is connected to outlet passage 913. Wire feeder 900 causes welding wire 901 to protrude from nozzle opening 915 provided at a tip of welding torch 910 by feeding welding wire 901 to welding torch 910 and causing welding wire 903 to stand by within torch cable 904.

FIG. 7 is a schematic view of conventional wire feeding system 502 disclosed in PTL 2. In wire feeding system 502, wire feeder 920A rotates wire reel 922A about spool shaft 921A to feed wire 923A, and wire feeder 920B rotates wire reel 922B about spool shaft 921B to feed wire 923B. Wire 923A passes through conduit tube 940A, feed guide opening 950A, branch line 950, feed guide opening 950C, and conduit tube 940, and is fed to welding torch 930. Wire 923B passes through conduit tube 940B, feed guide opening 950B, branch line 950, feed guide opening 950C, and conduit tube 940, and is fed to welding torch 930. Wire 923A and wire 923B are switched based on the presence of wire 923A which is detected by wire detecting device 941A, and the presence of wire 923B which is detected by wire detecting device 941B.

CITATION LIST

Patent Literature

PTL 1: Japanese Patent Laid-Open Publication No. 2006-198628
PTL 2: Japanese Patent Laid-Open Publication No. 56-168967

SUMMARY

A welding torch includes first to third wire passages, a wire detection space, and a wire detecting device. The first wire passage has a first wire inlet port allowing a first welding wire to enter thereto and a first wire outlet port allowing the first welding wire to be output therefrom. The second wire passage has a second wire inlet port allowing a second welding wire to enter thereto and a second wire outlet port allowing the second welding wire to be output therefrom. The third wire passage has a third wire inlet port allowing a portion of the first welding wire output from the first wire outlet port and a portion of the second welding wire output from the second wire outlet port to enter thereto, and a third wire outlet port allowing the portion of the first welding wire and the portion of the second welding wire to be output therefrom. The wire detection space is connected to the first and second wire outlet ports and the third wire inlet port. The wire detection space allows the portions of the first and second welding wire to pass through the wire detection space. The wire detecting device is configured to detect the portion of the first welding wire and the portion of the second welding wire in the wire detection space.

The welding torch can switch between the welding wires with a simple structure.

DETAIL DESCRIPTION OF EXEMPLARY EMBODIMENT

Figure 1:
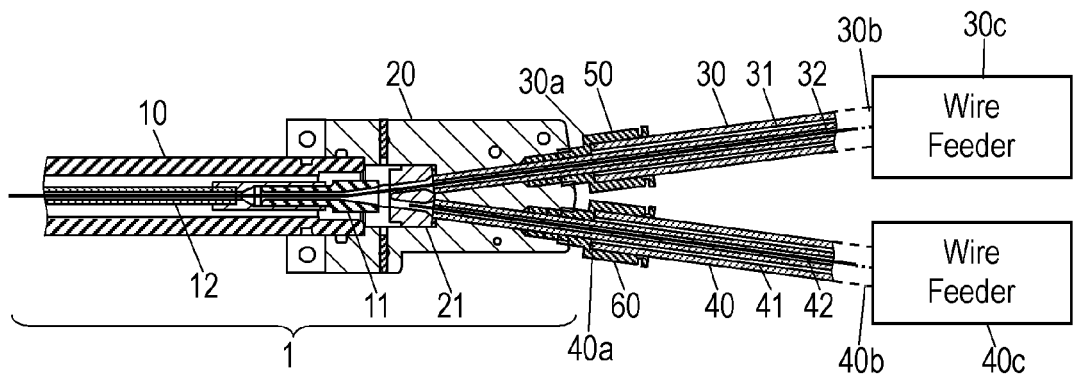
FIG. 1 is a sectional view of a welding torch according to an exemplary embodiment for illustrating a wire merging portion of the welding torch.
Figure 2:
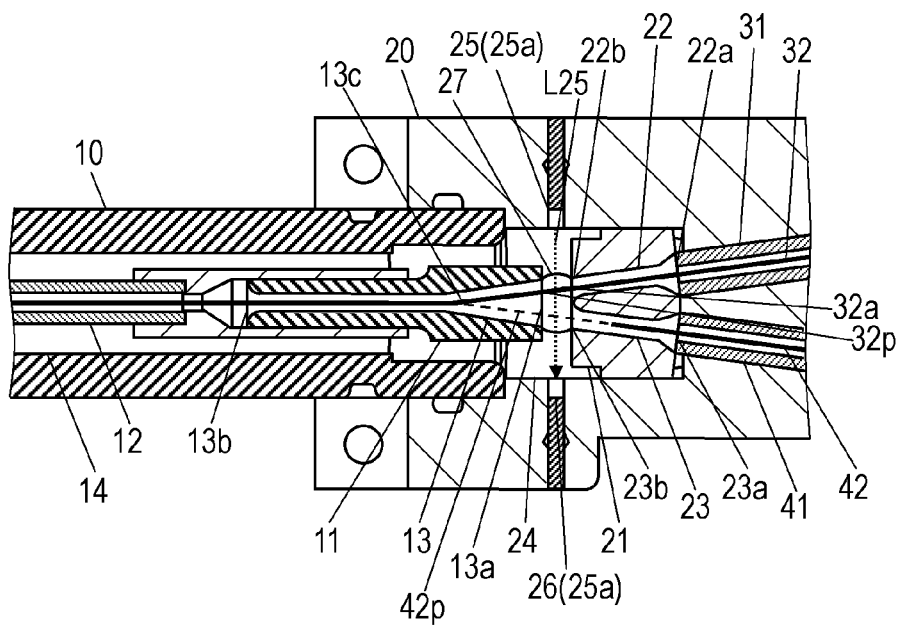
FIG. 2 is an enlarged view of the welding torch according to the embodiment.

FIG. 1 is a sectional view of welding torch 1 according to an exemplary the embodiment for illustrating wire merging portion 20. FIG. 2 is an enlarged view of welding torch 1 and illustrates torch body 10 and wire merging portion 20.

As illustrated in FIG. 1, welding torch 1 includes torch body 10 and wire merging portion 20. Torch cable 30 is connected to wire merging portion 20 with cable coupler 50 while torch cable 40 is connected to the wire merging portion with cable coupler 60. Torch cables 30 and 40 are attachable to cable couplers 50 and 60, and are detachable from cable couplers 50 and 60, respectively.

Torch cable 30 includes conduit tube 31 into which welding wire 32 is inserted. Back end 30*b* of torch cable 30 is connected to wire feeder 30*c* that feeds welding wire 32. Front end 30*a* of torch cable 30 is connected to cable coupler 50. Torch cable 40 includes conduit tube 41 into which welding wire 42 is inserted. Back end 40*b* of torch cable 40 is connected to wire feeder 40*c* that feeds welding wire 42. Front end 40*a* of torch cable 40 is connected to cable coupler 60. Wire feeder 30*c* performs a forward feeding and a reverse feeding of welding wire 32. In the forward feeding wire feeder 30*c* sends welding wire 32 out to welding torch 1. In the reverse feeding, wire feeder 30*c* sends welding wire 32 back from welding torch 1. Wire feeder 40*c* performs a forward feeding and a reverse feeding of welding wire 42. In the forward feeding, wire feeder 40*c* sends welding wire 42 out to welding torch 1. In the reverse feeding, wire feeder 40*c* sends welding wire 42 back from welding torch 1.

Conduit tubes 31 and 41 of torch cables 30 and 40 pass through centers of cable couplers 50 and 60, respectively, and are inserted into wire merging portion 20. Conduit tubes 31 and 41 reach inlet wire guide 21 in wire merging portion 20, and lead welding wires 32 and 42 to inlet wire guide 21. A structure of inlet wire guide 21 will be described later.

During actual welding, one of welding wires 32 and 42 is led from inlet wire guide 21 of wire merging portion 20 to outlet wire guide 11 provided in torch body 10 while the other welding wire stays within inlet wire guide 21. As illustrated in FIG. 1, in accordance with the embodiment, welding wire 32 is led to outlet wire guide 11 while welding wire 42 stays within inlet wire guide 21. In other words, a tip of welding wire 42 is positioned within inlet wire guide 21. A structure of outlet wire guide 11 will be described later.

Welding wire 32 led to outlet wire guide 11 of torch body 10 passes through the inside of inner tube 12 within torch body 10, and is supplied from a welding chip provided at the tip of welding torch 1 to a welding point through. While welding wire 32 is supplied to the welding point, a voltage is supplied from the welding chip to welding wire 32 so as to weld a workpiece by generating an arc between the workpiece and welding wire 32.

Wire merging portion 20 will be detailed below. FIG. 2 is an enlarged view of welding torch 1, and illustrates torch body 10 and wire merging portion 20. Wire passages 22 and 23 are provided in inlet wire guide 21. Wire passage 13 is provided in outlet wire guide 11. Wire detection space 24 is provided between inlet wire guide 21 and outlet wire guide 11.

Wire passage 22 has wire inlet port 22a and wire outlet port 22b. Wire inlet port 22a faces an end of conduit tube 31 while wire outlet port 22b faces wire detection space 24. Wire passage 23 has wire inlet port 23a and wire outlet port 23b. Inlet port 23a faces an end of conduit tube 41 while wire outlet port 23b faces wire detection space 24. Wire passage 13 has wire outlet port 13b and wire inlet port 13a. Wire outlet port 13b faces an end of inner tube 12 while wire inlet port 13a faces wire detection space 24. Wire inlet ports 22a, 23a, and 13a have conical shapes to facilitating welding wires 32 and 42 to be inserted into the inlet ports.

Wire inlet port 22a allows welding wire 32 to enter to wire inlet port 22a. Wire outlet port 22b allows welding wire 32 to be output from wire outlet port 22b. Welding wire 32 entering from wire inlet port 22a passes through wire passage 22 and is output from wire outlet port 22b. Wire inlet port 23a allows welding wire 42 to enter to wire inlet port 23a. Wire outlet port 23b allows welding wire 42 to be output from wire outlet port 23b. Welding wire 42 entering from wire inlet port 23a passes through wire passage 23 and is output from wire outlet port 23b. Wire inlet port 13a allows portion 32a of welding wire 32 output from wire outlet port 22b and portion 42a of welding wire 42 output from wire outlet port 23b to enter to wire inlet port 13a. Wire outlet port 13b allows portion 32a of welding wire 32 and portion 42a of welding wire 42 to be output from wire outlet port 13b.

Wire detection space 24 is connected to wire outlet port 23b, wire outlet port 22b, and wire inlet port 13a and to allow portion 32a of welding wire 32 and portion 42a of welding wire 42 to pass through wire detection space 24.

Portion 32a of welding wire 32 passes through path 32p. Portion 42a of welding wire 42 passes through path 42p. Path 32p crosses path 42p at intersection 13c in wire passage 13. Wire passage 22 and wire passage 23 are positioned radially about intersection 13c. Upon being fed simultaneously, welding wire 32 and welding wire 42 may collide together at intersection 13c. This structure allows welding wires 32 and 42 to be fed smoothly through inlet wire guide 21, wire detection space 24, and outlet wire guide 11 from conduit tubes 31 to inner tube 12.

In accordance with the embodiment, cable couplers 50 and 60 are positioned on lines linearly extending from wire passages 22 and 23, respectively. However, cable couplers 50 and 60 may not necessarily be positioned on the lines linearly extending from wire passages 22 and 23. Conduit tube 31 between cable coupler 50 and inlet wire guide 21 and conduit tube 41 between cable coupler 60 and inlet wire guide 21 may be bent.

Irradiator 25 and photodetector 26 are provided on side surfaces of wire detection space 24 of wire merging portion 20. Irradiator 25 and photodetector 26 constitute wire detecting device 25a. As illustrated in FIG. 2, detection light L25 is emitted from irradiator 25 toward photodetector 26. Irradiator 25 faces photodetector 26 such that detection light L25 crosses both of a position where welding wire 32 passes through and a position where welding wire 42 passes through. The positions where welding wires 32 and 42 pass through are, for example, on the lines linearly extending from wire passages 22 and 23. In addition, a position where welding wire 32 and welding wire 42 merge together is in wire passage 13 of outlet wire guide 11. Wire detecting device 25a detects the presence of welding wires 32 and 42 in wire detection space 24 in front of the position where the welding wires merge together.

If none of welding wire 32 and welding wire 42 does not exist in wire detection space 24, photodetector 26 detects the detection light from irradiator 25. If at least one of welding wire 32 and welding wire 42 exists in wire detection space 24, photodetector 26 does not detect the detection light from irradiator 25, or detects the detection light having a reduced intensity. Consequently, wire detecting device 25a can detect the existence of welding wire 32 or 42 in wire detection space 24. Detection light L25 from wire detecting device 25a is visible light or invisible light, such as infrared light. In a case where welding wires 32 and 42 are made mainly of magnetic material, such as iron, wire detecting device 25a may electrically detect the presence of welding wires 32 and 42 by measuring the capacitance of wire detection space 24 provided by a capacitor formed by a pair of electrodes facing each other across wire detection space 24 between the electrodes.

As illustrated in FIG. 2, gas inlet 27 is provided in the side surface of wire detection space 24 of wire merging portion 20. In FIG. 2, gas inlet 27 is provided behind welding wire 32. Gas passage 14 provided outside outlet wire guide 11 and outside inner tube 12 is provided within torch body 10. Gas passage 14 is connected to wire detection space 24. A shielding gas introduced from gas inlet 27 passes through wire detection space 24 and gas passage 14, and is supplied to a welding point from a welding nozzle provided at a tip of welding torch 1. In metal-inert-gas (MIG) welding, the shielding gas is made mainly of, for example, carbonic acid gas. In metal-active-gas (MAG) welding, the shielding gas is made mainly of, for example, argon.

Figure 3:
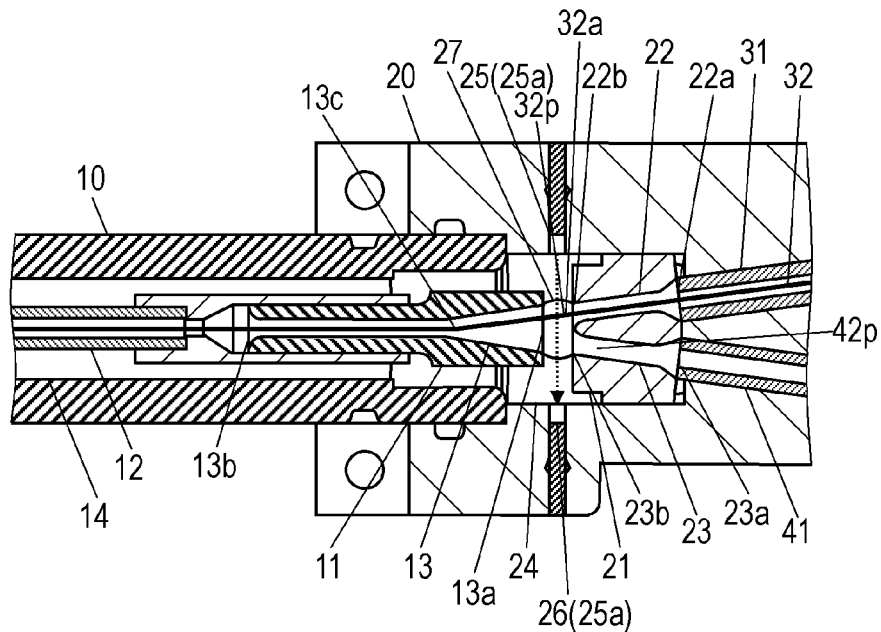
FIG. 3 illustrates a welding wire in the welding torch according to the embodiment.
Figure 4:
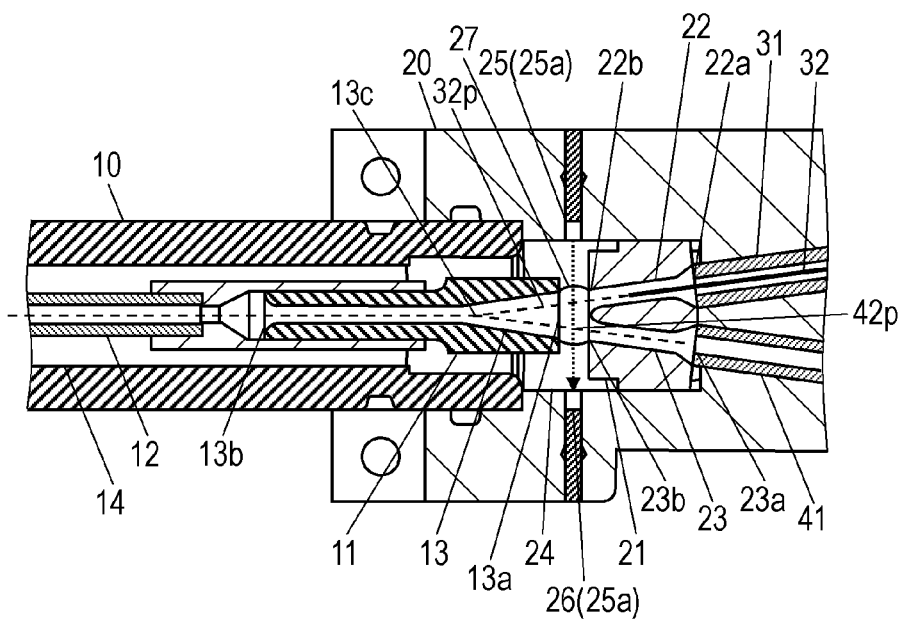
FIG. 4 illustrates a welding wire in the welding torch according to the embodiment.
Figure 5:
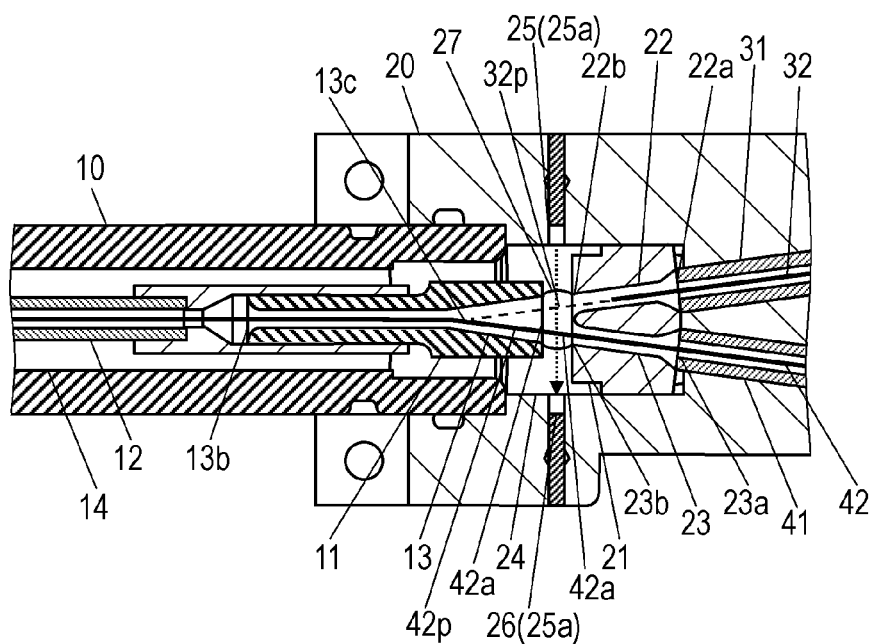
FIG. 5 illustrates a welding wire in the welding torch according to the embodiment.
Figure 6:
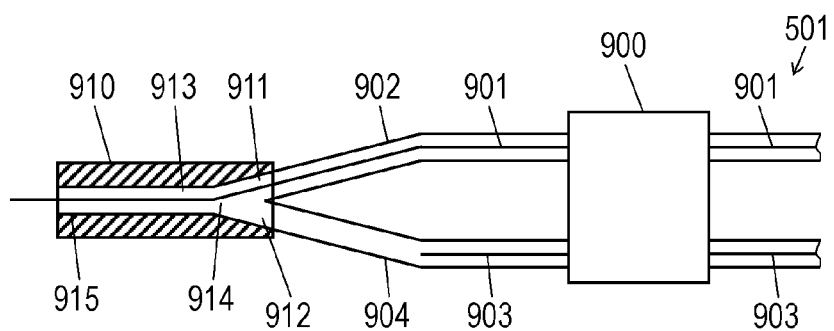
FIG. 6 is a schematic view of a conventional arc welding apparatus.
Figure 7:
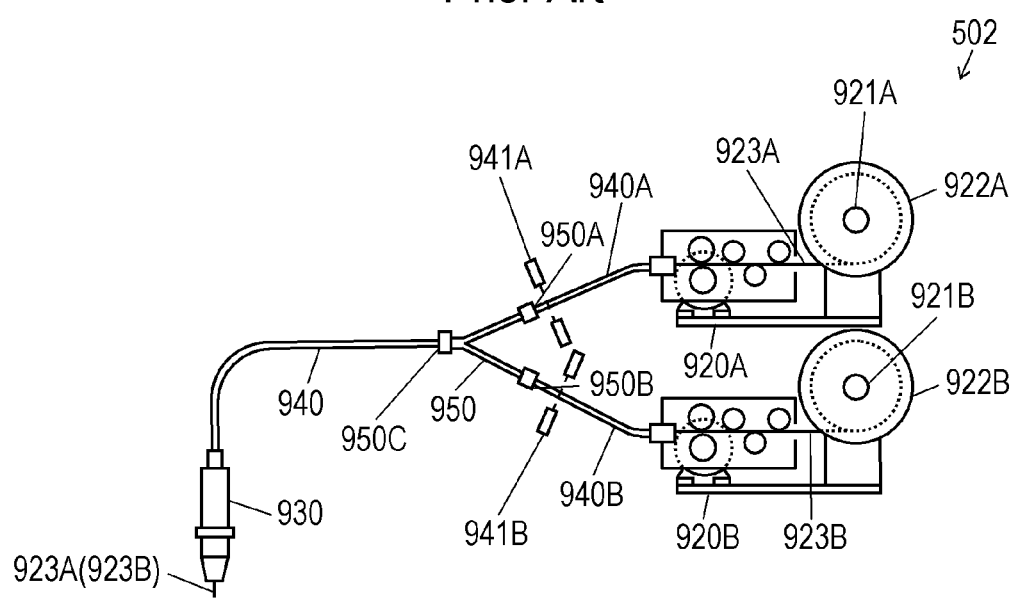
FIG. 7 is a schematic view of a conventional wire feeding system.

A method for switching welding wires with using welding torch 1 according to the embodiment will be described below. FIGS. 3 to 5 illustrate welding wires 32 and 42 in the method of switching welding wires 32 and 42 in welding torch 1.

First, as illustrated in FIG. 3, welding wire 42 does not pass through torch cable 40 while wire feeder 30c (refer to FIG. 1) feeds welding wire 32 to wire detection space 24 such that the wire passes through conduit tube 31 of torch cable 30 and wire passage 22 of inlet wire guide 21. Consequently, the wire detecting device (irradiator 25 and photodetector 26) detects portion 32a of welding wire 32 output from wire outlet port 22b due to detection light L25, and thus, detects the existence of welding wire 32 in wire detection space 24. Portion 32a of welding wire 32 passes through wire passage 13 and inner tube 12 of outlet wire guide 11, that is, passes through path 32p from wire outlet port 22b, and is fed to a welding point of a workpiece from a welding chip provided at the tip of torch body 10, thereby performing the welding.

During the welding, the shielding gas is supplied from gas inlet 27 of wire merging portion 20 to wire detection space 24, and passes through gas passage 14 so as to be supplied from the welding nozzle provided at the tip of torch body 10 to the welding point of the workpiece.

Next, welding wire 32 is switched to welding wire 42. As illustrated in FIG. 4, welded welding wire 32 is reversely fed and sent back such that the wire is moved away from torch body 10 by wire feeder 30c (refer to FIG. 1) connected to torch cable 30. At this moment, welding wire 32 is sent back while wire detecting device 25a detects whether or not welding wire 32 exists in wire detection space 24. When a tip of welding wire 32 passes through wire detection space 24 and portion 32a of welding wire 32 disappears, wire detecting device 25a detects that welding wire 32 does not exist in wire detection space 24. At this moment, wire feeder 30c stops the reverse feeding of welding wire 32. Welding wire 32 preferably stops when the tip of welding wire 32 is positioned within wire passage 22 of inlet wire guide 21. For example, the welding wire stops at a position where the tip of welding wire 32 is moved back by 3 mm from wire detection space 24. Consequently, welding wire 32 can be supplied to torch body 10 in a short period of time also when welding of welding wire 32 is started again.

Next, as in the feeding of welding wire 32 described above, welding wire 42 is fed to a welding chip provided at the tip of welding torch 1 to perform the welding, as illustrated in FIG. 5. In accordance with the embodiment, welding wires 32 and 42 have the same diameter and are made of different materials. Specifically, as illustrated in FIG. 5, while the tip of welding wire 32 is positioned within wire passage 22 of inlet wire guide 21, welding wire 42 passes through conduit tube 41 of torch cable 40 and wire passage 23 of inlet wire guide 21 so as to be fed by wire feeder 40c (refer to FIG. 1) to wire detection space 24. Consequently, the wire detecting device (irradiator 25 and photodetector 26) detects portion 42a of welding wire 42 output from wire outlet port 23b based on detection light L25, and detects the existence of welding wire 32 in wire detection space 24. Portion 42a of welding wire 42 passes through wire passage 13 and inner tube 12 of outlet wire guide 11, that is, passes through path 42p from wire outlet port 23b, so as to be fed to the welding point of the workpiece from the welding chip provided at the tip of torch body 10, thereby performing the welding.

During the welding of welding wire 32, the shielding gas is supplied from gas inlet 27 of wire merging portion 20 to wire detection space 24, and passes through gas passage 14 so as to be supplied from the welding nozzle provided at the tip of torch body 10 to the welding point of the workpiece.

In a case where welding wire 42 is again switched to welding wire 32, welding wire 42 is sent back from torch body 10 to wire passage 23 of inlet wire guide 21 while welding wire 42 is checked by wire feeder 40c (refer to FIG. 1), as in the pulling-back of welding wire 32 described above. For example, the welding wire is stopped at a position where the tip of welding wire 42 is moved back by 3 mm from wire detection space 24. Consequently, welding wire 42 can be supplied to torch body 10 in a short period of time also when welding of welding wire 42 is started again. Once welding wire 42 is sent back to wire passage 23, welding wire 32 which stands by in wire passage 22 is again fed to torch body 10 as illustrated in FIG. 2. After that, the state of FIG. 2 and the state of FIG. 5 are repeated when welding wire 32 and welding wire 42 are switched from one to another.

As described above, wire passage 22 has wire inlet port 22a and wire outlet port 22b. Wire inlet port 22a allows welding wire 32 to enter to wire inlet port 22a. Wire outlet port 22b allows welding wire 32 to be output from wire outlet port 22b. Wire passage 23 has wire inlet port 23a and wire outlet port 23b. Wire inlet port 23a allows welding wire 42 to enter to wire inlet port 23a. Wire outlet port 23b allows welding wire 42 to be output from wire outlet port 23b. Wire passage 13 has wire inlet port 13a and wire outlet port 13b. Wire inlet port 13a allows portion 32a of welding wire 32 output from wire outlet port 22b and portion 42a of welding wire 42 output from wire outlet port 23b to enter to wire inlet port 13a. Wire outlet port 13b allows portion 32a of welding wire 32 and portion 42a of welding wire 42 to be output from outlet port 13b. Wire detection space 24 is connected to wire outlet port 22b, wire outlet port 23b, and wire inlet port 13a. Wire detection space 24 allows portion 32a of welding wire 32 and portion 42a of welding wire 42 pass through. Wire detecting device 25a is configured so as to detect portion 32a of welding wire 32 and portion 42a of welding wire 42 in wire detection space 24.

Wire detecting device 25a may include irradiator 25 that emits detection light L25 and photodetector 26 that receives detection light L25.

Path 32p through which portion 32a of welding wire 32 passes may cross path 42p through which portion 42a of welding wire 42 at intersection 13c. In this case, detection light L25 passes through a position which is closer to wire outlet ports 22b and 23b than intersection 13c, and goes through paths 32p and 42p.

Conventional wire feeding system 502 disclosed in PTL 2 includes two wire detecting devices 920A and 920B for detecting a wire. If wire feeding system 520 is provided in welding apparatus 510 disclosed in PTL 1, the configuration of welding apparatus becomes complicated.

In welding torch 1 according to the embodiment, when switching between two different welding wires 32 and 42, a distance by which reverse fed welding wires 32 and 42 are sent back and a distance by which the welding wires are fed again can be minimized. Thus, welding wires 32 and 42 can be switched in a short period of time. In addition, since one wire detecting device 25a detects two different welding wires 32 and 42, the structure is simple.

When welding wires 32 and 42 are fed in the forward and reverse feedings, abrasion powder is generated at the outlet port or inlet port of the wire passage, and accumulates in wire detection space 24, thereby degrading the detection performance of wire detecting device 25a. Abrasion powder of welding wires 32 and 42 is likely to accumulate at a wire merging point of wire passage 13, a load of wire feeding increases, and wire feeding performance declines. However, since gas inlet 27 at wire merging portion 20 is provided in wire detection space 24, welding torch 1 according to the embodiment maintains wire detection space 24 and wire passage 13 of outlet wire guide 11 to be clean where there is no abrasion powder of welding wires 32 and 42 by spraying the shielding gas during the welding. In a case where a significantly large amount of abrasion powder of welding wires 32 and 42 is generated, it is possible to cause compressed air to flow into gas inlet 27 while switching between welding wires 32 and 42 and to forcibly discharge abrasion powder through the torch tip.

REFERENCE MARKS IN THE DRAWINGS

1 welding torch
10 torch body
11 outlet wire guide
12 inner tube
13 wire passage (third wire passage)
13a wire inlet port (third wire inlet port)
13b wire outlet port (third wire outlet port)
13c intersection
14 gas passage
20 wire merging portion
22 wire passage (first wire passage)
22a wire inlet port (first wire inlet port)
22b wire outlet port (first wire outlet port)
23 wire passage (second wire passage)
23a wire inlet port (second wire inlet port)
23b wire outlet port (second wire outlet port)
21 inlet wire guide
24 wire detection space
25 irradiator
26 photodetector
27 gas inlet
30, 40 torch cable
31, 41 conduit tube
32 welding wire (first welding wire)
32p path (first path)
42 welding wire (second welding wire)
42p path (second path)
50, 60 cable coupler

The invention claimed is:

1. A welding torch comprising:
a first wire passage having a first wire inlet port and a first wire outlet port, the first wire inlet port allowing a first welding wire to enter thereto, the first wire outlet port allowing the first welding wire to be output therefrom;
a second wire passage having a second wire inlet port and a second wire outlet port, the second wire inlet port allowing a second welding wire to enter thereto, the second wire outlet port allowing the second welding wire to be output therefrom;
a third wire passage having a third wire inlet port and a third wire outlet port, the third wire inlet port allowing a portion of the first welding wire output from the first wire outlet port and a portion of the second welding wire output from the second wire outlet port to enter thereto, the third wire outlet port allowing the portion of the first welding wire and the portion of the second welding wire to be output therefrom;
a wire detection space connected to the first wire outlet port, the second wire outlet port, and the third wire inlet port, the wire detection space allowing the portion of the first welding wire and the portion of the second welding wire to pass through the wire detection space; and
a wire detecting device configured to detect the portion of the first welding wire and the portion of the second welding wire in the wire detection space,
wherein the wire detecting device includes:
an irradiator configured to emit detection light such that the detection light is directed to pass through: (a) a first portion of the wire detection space located between the first wire outlet port and the third wire inlet port, and (b) a second portion of the wire detection space located between the second wire outlet port and the third wire inlet port, and
a photodetector configured to receive the detection light in the absence of wire in the detection space.

2. The welding torch of claim 1,
wherein a first path through which the portion of the first welding wire passes intersects a second path through which the portion of the second welding wire passes, and
wherein the detection light passes through a position which is closer to the first wire outlet port and the second wire outlet port than the intersection, and passes through the first path and the second path.

3. The welding torch of claim 1, further comprising a gas inlet provided at the wire detection space to supply a shielding gas the to the wire detection space.

4. The welding torch of claim 1, wherein the first and the second wire passages are arranged such that a central longitudinal axis of the first wire passage and a central longitudinal axis of the second wire passage intersect in the third wire passage.

* * * * *